(12) United States Patent
Knauf et al.

(10) Patent No.: US 6,350,833 B1
(45) Date of Patent: Feb. 26, 2002

(54) METHOD FOR THE SUSPENSION POLYMERIZATION OF CONJUGATED DIENES

(75) Inventors: Thomas Knauf, Dormagen; Gerd Sylvester; Claudia Schmid, both of Leverkusen, all of (DE); Akhtar Osman, Sarnia (CA)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/556,007

(22) Filed: Apr. 20, 2000

(30) Foreign Application Priority Data

Apr. 30, 1999 (DE) .......................................... 199 19 870

(51) Int. Cl.[7] .................................................. C08F 4/14
(52) U.S. Cl. ..................................... 526/164; 526/340.4
(58) Field of Search ................................ 526/164, 340.4

(56) References Cited

U.S. PATENT DOCUMENTS 4,994,534 A    2/1991   Rhee et al. .................... 526/88

6,284,697 B1 *  9/2001  Windisch et al. ........... 502/102

FOREIGN PATENT DOCUMENTS

| CA | 1143711   | 3/1983 |
| EP | 0 773 243 | 5/1997 |
| GB | 2092163   | 8/1982 |
| IT |  764295   | 1/1968 |
| JP | 58-154705 | 9/1983 |

* cited by examiner

Primary Examiner—David W. Wu
(74) Attorney, Agent, or Firm—Joseph C. Gil; Noland J. Cheung

(57) ABSTRACT

This invention relates to a method for the suspension polymerization of conjugated dienes in hydrocarbon mixtures comprising a fraction by volume greater than 80% of $C_4$ hydrocarbons wherein polymerization is conducted in the presence of a rare earth compound, of one or more aluminum compounds, and optionally of an additional Lewis acid. The invention further relates to the polymers which can be produced according to the present invention and to the use thereof for the production of moldings of all types, particularly tires and industrial rubber products, and for blending with polystyrene (HIPS).

8 Claims, No Drawings

METHOD FOR THE SUSPENSION POLYMERIZATION OF CONJUGATED DIENES

FIELD OF THE INVENTION

This invention relates to a method for the suspension polymerization of conjugated dienes in hydrocarbon mixtures, particularly butadiene and/or isoprene, in industrial $C_4$ hydrocarbon mixtures.

BACKGROUND OF THE INVENTION

Polybutadiene with a high content of cis-1,4 units has long been produced industrially on a large scale, and is used for the production of tires and other rubber products. For this application, polymerization is conducted in a liquid phase using very different catalyst systems in solution.

Polybutadienes with a particularly high content of cis-1,4 units are particularly advantageously produced as described in EP-A-0,111,184. The catalyst system which is disclosed consists of a rare earth carboxylate, an aluminum trialkyl and/or an alkyl-aluminum hydride and an additional Lewis acid.

IT-764 295 discloses the polymerization of butadiene in $C_4$ fractions which have been freed from isobutanes and which contain 5 to 20% of aromatic compounds in order to improve the solubility of the polybutadiene.

The polymerization of conjugated dienes in solution has the disadvantage that the solution is viscous and the solids concentration is therefore generally limited to 10 to 20% by weight.

It is also known that the polymerization of conjugated dienes can be conducted in the pure liquid monomers without the addition of solvents. In this procedure, however, large amounts of heat have to be dissipated at high conversions. This can only be effected with difficulty on account of the high viscosity of the reaction mixture, and therefore necessitates costly equipment and results in a certain potential hazard.

Polymerization in the gas phase has the decisive disadvantage of a very low conversion which is achieved per pass through the reactor. A corresponding method is described in U.S. Pat. No. 4,994,534.

Suspension polymerization methods could constitute an improvement here. In methods such as these, polymerization is conducted in the presence of a diluent which is insoluble in the resultant polymer. The polymer is produced in finely divided form and is suspended in the diluent. Therefore, in contrast to solution or bulk polymerization methods, suspensions such as these only exhibit a very low viscosity, due to which the dissipation of heat and the flow properties are considerably improved, and high solids concentrations and high productivity is therefore possible.

DE-A1-229,138 discloses a method for the selective polymerization of butadene from $C_4$ fractions using lithium catalysts. However, average molecular weights of up to 10,000 are achieved, which are extremely low, and moreover, cis-polybutadienes cannot be obtained by means of lithium catalysts.

EP-A 773,243 discloses a process for the polymerization of oc-olefins and optionally of diolefins in suspension. An inert solvent/diluent system is used here, and butadiene is added, for example. The butadiene must be present in its pure form for this purpose.

The butadiene which is required for the production of polybutadiene is produced nowadays in a manner which is costly on an industrial scale, namely by the separation of butadiene from industrial $C_4$ hydrocarbon mixtures. It would be desirable to dispense with this additional separation step, but industrial $C_4$ hydrocarbon mixtures often contain undesirable constituents, particularly 1,2-butadiene.

There was, therefore, a continuing need for a method for the polymerization of dienes in hydrocarbon mixtures comprising a volume fraction greater than 80% of $C_4$ hydrocarbons to form cis-containing polydienes.

SUMMARY OF THE INVENTION

This object is achieved according to the present invention by a method for the suspension polymerization of conjugated dienes in hydrocarbon mixtures comprising a volume fraction greater than 80% of $C_4$ hydrocarbons, characterized in that polymerization is conducted in the presence of a rare earth compound, of one or more aluminum compounds, and optionally of an additional Lewis acid.

DETAILED DESCRIPTION OF THE INVENTION

Conjugated dienes in the sense of the present invention are 1,3-butadiene and isoprene, in particular.

The hydrocarbon mixtures according to the present invention contain at least 80% by volume of $C_4$ hydrocarbons, particularly at least 90% by volume of $C_4$ hydrocarbons, and most particularly, at least 95% by volume of $C_4$ hydrocarbons.

In the sense of the present invention, the expression "$C_4$ hydrocarbons" denotes all the saturated, singly- or multiply-unsaturated hydrocarbons comprising 4 C atoms, which are known to one skilled in the art, with the exception of alkynes. Examples of $C_4$ hydrocarbons according to the present invention include butanes such as n-butane, i-butane and cyclobutane, butenes such as 1-butene, 2-butene and i-butene, and butadienes such as 1,3-butadiene and 1,2-butadiene. One particular advantage of the method described herein is that 1,2-butadiene does not have to be removed as it does in prior art methods. This is not only advantageous economically, but is also advantageous environmentally. For this reason, the $C_4$ hydrocarbons according to the present invention preferably contain admixed 1,2-butadiene which has not been removed. Alkynes impair the method and should be substantially removed.

$C_4$ hydrocarbon mixtures of the following composition by volume are preferably used:

| | |
|---|---|
| 1,3-butadiene | 30–50% |
| butene | 33–53% |
| butane | 5–15% |
| 1,2-butadiene | 0.001–1% |
| alkynes | 0.05%, |
| balance | 0.1–1% |

In addition, $C_4$ hydrocarbon mixtures of the following composition by volume are preferably used as diluents:

| | |
|---|---|
| 1,3-butadiene | 0–2% |
| butene | 66–80% |
| butane | 18–33% |
| 1,2-butadiene | 0.001–0.4% |
| alkynes | 0 |
| balance | 0–0.6% |

$C_4$ hydrocarbon mixtures which are also preferred ($C_4$ Hydrocarbons and Derivatives: Resources, Production, Marketing, J. Schulze, M. Homann, Springer-Verlag Berlin, 1989, Chapter 1.2–1.4) are those which are known to one skilled in the art as a $C_4$ cut, raffinate 1 and raffinate 2. These can also, of course, contain 1,2-butadiene in addition.

These industrial $C_4$ hydrocarbon mixtures preferably originate directly from a steam cracker and after removing the alkynes are used without a further purification or concentration stage.

In addition, pure butane or mixtures of butane and 1,2-butadiene with a content of up to 5% by volume of 1,2-butadiene are also preferably used.

It is obvious to one skilled in the art that the said fractions by volume of the individual components of the $C_4$ hydrocarbon mixture must add up 100%.

If the $C_4$ hydrocarbon mixtures, which can be used according to the present invention already contain polymerizable conjugated dienes, these can be used directly in the method according to the present invention without further intermediate steps. The $C_4$ hydrocarbon mixture then acts both as a diluent and as a source of monomers. However, it is also possible, of course, to admix further conjugated dienes or to increase the concentration of conjugated dienes which are already present. It should be ensured here, however, that the method still constitutes suspension polymerization and does not constitute solution polymerization. Suitable concentrations of monomer or monomers can readily be determined by just a few preliminary tests. The monomer concentrations usually range between 0.1 and 60% by volume, particularly between 5–50 and most particularly 10–40% by volume.

The hydrocarbon mixtures which can be used may contain a volume fraction of up to 20% of higher hydrocarbons. However, it should be ensured that the latter do not have a disadvantageous effect on polymerization. Suitable higher hydrocarbons include linear, branched cyclic hydrocarbons, which may be saturated, unsaturated or aromatic, e.g. $C_5$–$C_{50}$ alkanes such as n-pentane, i-pentane, cyclopentane, n-hexane, i-hexane, cyclohexane, n-heptane, i-heptane, n-octane, i-octane, nonane, decane or undecane; $C_5$–$C_{50}$ alkenes such as pentene, cyclopentene, hexene, cyclohexene, heptene, octene, nonene, decene or undecene; non-conjugated, multiply-unsaturated hydrocarbons such as 1,4-pentadiene, hexadiene, cyclohexadiene, heptadiene, octadi- or triene, nonadi- or triene; or aromatic compounds such as benzene and toluene.

The preferred rare earth compounds are a rare earth alcoholate (I), a rare earth carboxylate (II), a rare earth complex compound with diketones (III) and/or a rare earth halide addition compound with an oxygen or nitrogen donor compound (IV) corresponding to the following formulae:

(RO)₃M         (I)

(R—CO₂)₃M      (II)

(RCOCHCOR)₃M   (III)

and

MX₃.y donor    (IV), wherein, in the above formulae:

M denotes a trivalent rare earth element with an atomic number of 21, 39 or 57 to 71 as in the IUPAC periodic table of the elements, the R entities are the same or different and denote branched or unbranched alkyl radicals comprising 1 to 10 carbon atoms, X represents chlorine, bromine or iodine, and y denotes 1 to 6.

The preferred compounds are those in which M denotes lanthanum, cerium, praseodymium, neodymium or gadolinium, or in which M denotes a mixture of rare earth elements which contains at least 10% by weight of at least one of the elements lanthanum, cerium, praseodymium, neodymium or gadolinium. The compounds which are most particularly preferred are those in which M denotes lanthanum or neodymium, or in which M denotes a mixture of rare earths which contain at least 30% by weight of lanthanum or neodymium.

The radicals R which are particularly suitable in formulae (I) to (IV) include straight chain or branched alkyl radicals comprising 1 to 20 carbon atoms, preferably 1 to 15 carbon atoms, such as methyl, ethyl, n-propyl, n-butyl, n-pentyl, isopropyl, isobutyl, tert.-butyl, 2-ethylhexyl, neo-pentyl, neo-octyl, neo-decyl and neo-dodecyl.

Examples of suitable rare earth alcoholates (I) include: neodymium(III) n-propanolate, neodymium(III) n-butanolate, neodymium(III) n-decanolate, neodymium (III) isopropanolate, neodymium(III) 2-ethyl-hexanolate, praseodymium (III) n-propanolate, praseodymium (III) n-butanolate, praseodymium(III) n-decanolate, praseodymium(III) isopropanolate, praseodymium(III) 2-ethyl-hexanolate, lanthanum(III) n-propanolate, lanthanum(III) n-butanolate, lanthanum(III) n-decanolate, lanthanum(III) isopropanolate, lanthanum(III) 2-ethyl-hexanolate, preferably neodymium(III) n-butanolate, neodymium(III) n-decanolate and neodymium(III) 2-ethyl-hexanolate.

Suitable rare earth (II) carboxylates include: lanthanum (III) propionate, lanthanum (II) diethylacetate, lanthanum (III) 2-ethyl-hexanoate, lanthanum(III) stearate, lanthanum (III) benzoate, lanthanum(III) cyclohexanecarboxylate, lanthanum(III) oleate, lanthanum(III) versatate, lanthanum (III) naphthenate, praseodymium(III) propionate, praseodymium(III) diethylacetate, praseodymium(III) 2-ethylhexanoate, praseodymium(III) stearate, praseodymium(III) benzoate, praseodymium(III) cyclohexanecarboxylate, praseodymium(III) oleate, praseodymium(III) versatate, praseodymium(III) naphthenate, neodymium(III) propionate, neodymium(III) diethylacetate, neodymium(III) 2-ethylhexanoate, neodymium(III) stearate, neodymium(III) benzoate, neodymium(III) cyclohexanecarboxylate, neodymium(III) oleate, neodymium(IIII) versatate and neodymium(III) naphthenate, preferably neodymium(III) 2-ethylhexanoate, neodymium(III) versatate and neodymium (III) naphthenate. Neodymium versatate is most preferably used.

Suitable complex compounds with rare earth (III) diketones include: lanthanum(III) acetylacetonate, praseodymium(III) acetylacetonate and neodymium(III) acetylacetonate, preferably neodymium(III) acetylacetonate.

Examples of addition compounds of rare earths with donors (IV) include: lanthanum(III) chloride with tributyl phosphate, lanthanum(III) chloride with tris(2-ethyl-hexyl) phosphate, lanthanum(III) chloride with tetrahydrofuran, lanthanum(III) chloride with isopropanol, lanthanum(III) chloride with pyridine, lanthanum(III) chloride with 2-ethylhexanol, lanthanum(III) chloride with ethanol, praseodymium(III) chloride with tributyl phosphate, praseodymium(III) chloride with tetrahydrofuran, praseodymium(III) chloride with isopropanol, praseodymium(III) chloride with pyridine, praseodymium (III) chloride with 2-ethylhexanol, praseodymium(III) chloride with ethanol, neodymium(III) chloride with tributyl phosphate, neodymium(III) chloride with tris(2-ethyl-hexyl) phosphate, neodymium(III) chloride with tetrahydrofuran, neodymium(III) chloride with isopropanol, neodymium(III) chloride with pyridine, neodymium(III)-chloride with 1,2-ethylhexanol, neodymium(III) chloride with ethanol, lanthanum(III) bromide with tributyl phosphate, lanthanum (III) bromide with tetrahydrofuran, lanthanum(III) bromide with isopropanol, lanthanum(III) bromide with pyridine, lanthanum(III) bromide with 2-ethylhexanol, lanthanum(III) bromide with ethanol praseodymium(III) bromide with tributyl phosphate, praseodymium(III) bromide with tetrahydrofuran, praseodymium(III) bromide with isopropanol, praseodymium(III) bromide with pyridine, praseodymium(III) bromide with 2-ethylhexanol, praseodymium(III) bromide with ethanol, neodymium(III) bromide with tributyl phosphate, neodymium(III) bromide with tetrahydrofuran, neodymium(III) bromide with isopropanol, neodymium(III) bromide with pyridine, neodymium(III) bromide with 2-ethylhexanol, and neodymium(III) bromide with ethanol, preferably lanthanum(III) chloride with tributyl phosphate, lanthanum (III) chloride with pyridine, lanthanum(III) chloride with 2-ethylhexanol, praseodymium(III) chloride with tributyl phosphate, praseodymium(III) chloride with 2-ethylhexanol, neodymium(III) chloride with tributyl phosphate, neodymium(III) chloride with tetrahydrofuran, neodymium(III) chloride with 2-ethylhexanol, neodymium (III) chloride with pyridine, neodymium(III) chloride with 2-ethylhexanol and neodymium(III) chloride with ethanol.

The rare earth compounds can be used individually or in admixture with each other.

The rare earth compounds which are most particularly preferred are the addition compounds of neodymium(III) chloride with ethanol or tris(2-ethyl-hexyl) phosphate, neodymium octanoate and/or neodymium naphthenate.

Suitable aluminum compounds include aluminum trialkyls, dialkylaluminum hydrides and/or aluminoxanes of general formulae:

AlR$_3$ (V)

HAlR$_2$ (VI)

R(AlO)$_n$AlR$_2$ (VII), optionally in combination with an additional Lewis acid.

In formulae (V) to (VII), n denotes an integer within the range from 1 to 60, and R denotes a straight chain or branched alkyl radical comprising 1 to 10 C atoms, preferably 1 to 4 C atoms.

Examples of suitable aluminum alkyls of formulae (V) and (VI) include: trimethylaluminum, triethylaluminum, tri-n-propylaluminum, triisopropylaluminum, tri-n-butylaluminum, triisobutylaluminum, tripentylaluminum, trihexyl-aluminum, tri-cyclohexylaluminum, trioctylaluminum, diethylaluminum hydride, di-n-butylaluminum hydride and di-isobutylaluminum hydride. Triethylaluminum, triisobutylaluminum and di-isobutylaluminum hydride are preferred. Di-isobutylaluminum hydride is particularly preferred.

Examples of alumoxanes (VII) include: methyl alumoxane, ethyl alumoxane and isobutyl alumoxane, preferably methyl alumoxane and isobutyl alumoxane.

Examples of other suitable Lewis acids include organo-metallic halides in which the metal atom belongs to Group 3a) or 4a), and halides of elements of Groups 13, 14 and 15 of the periodic table as represented in the Handbook of Chemistry and Physics, 76th Edition, 1995.

The following are particularly suitable:
methylaluminum dibromide, methylaluminum dichloride, ethylaluminum dibromide, ethylaluminum dichloride, butylaluminum dibromide, butyl aluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminum sesquichloride, ethylaluminum sesquibromide, ethylaluminum sesquichloride, aluminum tribromide, antimony trichloride, antimony pentachloride, phosphorus trichloride, phosphorus pentachloride, tin tetrachloride.

Diethylaluminum chloride, ethylaluminum sesquichloride, ethylaluminum dichloride, diethylaluminum bromide, ethylaluminum sesquibromide and/or ethylaluminum dibromide are preferably used.

The reaction products of aluminum compounds of general formulae (V) to (VII) with halogens or halogen compounds, e.g. of triethylaluminum with bromine or triethylaluminum with butyl chloride, can also be used as additional Lewis acids. In this case, the reaction can be conducted separately or the amount of alkylaluminum compound which is necessary for the reaction can be added to the aluminum compound.

Butyl chloride and butyl bromide are preferred.

The additional Lewis acid can be dispensed with if a compound of general formula (VII) is used from general formulae (V) to (VII), or if a compound of formula (IV) is used as a rare earth compound.

The molar ratio in which the catalyst components are used can be varied within wide limits.

The molar ratio of the rare earth compound to the aluminum compound of general formulae (V)–(VII) ranges from 1:1 to 1:1000, preferably from 1:3 to 1:200, most preferably from 1:3 to 1:100. The molar ratio of the rare earth compound to the additional Lewis acid ranges from 1:0.4 to 1:15, preferably from 1:0.5 to 1:8. The catalyst concentrations which are employed usually fall within the range from 0.001–2 mmol of rare earth compound per 100 g monomer, particularly from 0.03–1 mmol, most particularly from 0.05–0.2 mmol.

The rare earth compounds can be used in unsupported or supported form. The aluminum compound/aluminum compounds and/or the Lewis acid or Lewis acids can also be used in unsupported or supported form. It is also possible for only the rare earth compound or the aluminum compound or the Lewis acid/Lewis acids to be used in supported form, or for all the components to be used jointly in a supported form.

All the components are preferably used jointly in a supported form.

Organic or inorganic particulate solids with a specific surface greater than 10, preferably of 10 to 1000 m$^2$/g (BET) and a pore volume of 0.3 to 15, preferably of 0.5 to 12 ml/g, can be used as supports.

The (BET) specific surface is determined in the usual manner according to Brunauer, Emmet and Teller, J. Anorg. Chem. Soc. 60 (2), 309 (1938). The pore volume is determined by the centrifugation method according to M. McDaniel, J. Colloid Interface Sci. 78, 31(1980).

Substances which are particularly suitable as supports include silica gels, precipitated hydrated silicas, clays, aluminosilicates, french chalk, zeolites, carbon black, activated carbons, inorganic oxides such as silica, alumina, magnesia or titanium dioxide, or silicon carbide, polyethylene, polystyrene or polypropylene. Silica gels, precipitated hydrated silicas, zeolites, polystyrene, polypropylene and carbon black are preferred. Silica gel, precipitated hydrated silicas, polypropylene and carbon black are particularly preferred. The support can be inert to the catalyst system or can contain functional groups which chemically bond to one or more components of the catalyst. In this situation, the term "inert" should be understood to mean that the solids contain neither a reactive group at their surface nor an adsorbed material which prevent the formation of an active catalyst or which react with the monomer.

Solids which comply with the aforementioned specification, and which are therefore suitable for use, are described in greater detail in Ullmanns Enzyclopädie der technischen Chemie, Volume 21. page 439 et seq. (silica gels), Volume 23, page 5 et seq. (clays), Volume 14, page 633 et seq. (carbon blacks), Volume 24, page 575 et seq., and Volume 17, page 9 et seq. (zeolites).

The solids can be used individually or in admixture with each other. 0.1 mmol to 1 mol of the rare earth compound, preferably 1 to 50 mmol, are used per 100 g of support.

It is also possible to add a further component to the optionally supported catalyst components. This further component is a conjugated diene which can be the same as that which is subsequently to be polymerized with the catalyst. Butadiene and isoprene are preferably used, and isoprene is most preferably used.

If said further component is added to the catalyst, the amount thereof is preferably 1–1000 mol with respect to 1 mol of the rare earth compound, most preferably 1–100 mol. The amount which is most particularly preferred is 1–50 mol with respect to 1 mol of the rare earth compound.

The method according to the present invention can be conducted at pressures from 0.5 to 50 bar. preferably from 1 to 20 bar.

The temperature can be varied within wide limits, and essentially depends on the mutual solubility of the materials used and on the molecular weight and solids concentration. Polymerization is generally conducted at temperatures from −10 to 250° C., preferably at 10 to 200° C., most preferably at 20 to 160° C.

Polymerization can be conducted, continuously or batchwise, in customary apparatuses which are suitable for polymerization reactions, e.g. in a cascade of stirred vessels or in a stirred reactor.

The polymer concentration generally falls within the range from 5–50% by weight.

The addition of known powder media can be of assistance in order to prevent conglomeration of the growing polymer particles. All inert, fine-grained solids can be used as powder media, particularly the inert, inorganic solids described above as supports. The diameter of the primary particles of the powder media can range between 1 and 100 nm. If the primary particles form aggregates or agglomerates, the diameter of these particles ranges between 1 and 500 μm. The amount of admixed powder media depends on the other processing parameters such as the temperature and solids content, and can easily be optimized by one skilled in the art, by performing a few tests. Up to 30% by weight of powder media are generally added, particularly an amount within the range from 0–20% by weight, and most particularly an amount within the range from 0–5% by weight.

Suspension polymerization has the advantage that due to its low viscosity, the reaction mixture is more mobile than a comparable reaction solution in a solution polymerization or bulk polymerization process. This also has a positive effect on the dissipation of heat and on the flow properties of the reaction mixture in pipelines, etc.

The polymers, which are obtained, have a content of cis-1,4 double bonds from about 60 to 99%. The molecular weight can be varied by the composition of the catalyst and by varying the polymerization conditions. Molecular weights of $10^3$ to $10^7$, as measured by GPC (gel permeation chromatography), are customary.

The molecular weight can be adjusted in the known manner by the polymerization conditions, by the catalyst composition or by the addition of regulators. Examples of suitable regulators include hydride compounds, aromatic compounds or cumulated dienes.

The Mooney viscosity, ML (1+4', 100° C.) generally falls within the range between 30 and 80 MU. Very high molecular weight polymers, which can only be obtained in an extremely costly manner by solution polymerization on account of their high viscosity, can also be produced by polymerization in the gas phase.

The polymers obtained can be isolated, compounded and vulcanized in the usual manner. They are distinguished by their large surface area.

The polymers obtained are suitable for the production of moldings of all types, particularly tires and industrial rubber products, and for blending with polystyrene (HIPS).

The following examples serve to clarify the present invention, but without the invention being restricted thereto.

EXAMPLES

Example 1 a) Pretreatment of the Support

Zeosil 1165 MP was used as the support. Zeosil 1165 MP is a precipitated hydrated silica manufactured by Rhone-Poulenc with an average particle size of 252 μm and a BET specific surface of 139 m²/g. The pore volume is 1.97 ml/g. The Zeosil 1165 MP was dried before use in a countercurrent flow of nitrogen at 900° C., and was taken off with the exclusion of air and moisture.

b) Preparation of the Catalyst

A catalyst was prepared by mixing 120 ml of dry n-hexane, 150 mmol diisobutylaluminum hydride (DIBAH) and 5.0 mmol ethylaluminum sesquichloride (EASC) in a 1 liter flask fitted with an $N_2$ inlet and a magnetic stirrer. After 1.25 g butadiene had been added to the solution, 5.0 mmol neodymium versatate (NDV) were added. The resulting mixture was added to a slurry comprising 100 g of the support described in a) in 200 ml n-hexane. After 5 minutes, the batch was evaporated to dryness under vacuum. 106 g of a free-flowing powder were isolated.

c) Preparation of a Powder Medium 100 g Zeosil Z545 were mixed with a solution of 25 mmol DIBAH dissolved in 300 ml hexane and evaporated to dryness under vacuum.

d) Polymerization

Polymerization was conducted in a 2 liter reactor fitted with a condenser and temperature sensor and with a heating and cooling mantle. 350 g butane and 90 g butadiene were condensed into the batch. The batch was subsequently heated to 40° C. and 8.7 g of the catalyst system described in b) and 7.6 g of the pretreated powder medium as described in c) were added. The batch was stirred for 1:45 hours at 40° C. Over the entire duration of the experiment the suspension had a low viscosity and could easily be stirred, and no deposits were formed on the stirrer or on the reactor walls. Thereafter, the reaction was stopped by adding 10 ml ethanol, and butane and excess monomer were removed by evaporation. The yield was 86 g (77.4%).

Examples 2–5.

A 1 liter bottle was dried, rendered inert with nitrogen, and fitted with a septum cap. 197 g of a C4 cut (see Table 2.1 for the composition thereof) was then introduced into the bottle and was diluted with 303 g of dry, inert n-hexane. Diisobutylaluminum chloride (DIBAH) (20% in hexane), ethylaluminum sesquichloride (EASC) (0.25% in hexane) and neodymium versatate (20% in hexane) were subsequently added in this sequence and with shaking, at 25° C. Polymerization was conducted in a water bath which was heated to a controlled temperature of 60° C. whilst shaking the bottle. A polymerization time of 2 hours was employed. Polymerization was terminated by adding a few drops of ethanol, the product was precipitated by adding 0.2 parts 2,6 di-t.-butyl -p-cresol (BHT) stabilized with ethanol, and was dried under reduced pressure at 70° C. The liquid phase, including the precipitant, was tested for unreacted 1,3-butadiene (CC), and the polymers were investigated by IR/NMR (cis-1,4 content), GPC (Mn and Mw), DSC (glass transition temperature) and Mooney viscosity measurements (Mooney value ML 1+4 100° C.).

TABLE 2.1

Composition of the C4 cut

| | Before polymerization [%] | After polymerization [%] |
|---|---|---|
| isobutane | 0.99 | 1.77 |
| n-butane | 9.08 | 16.21 |
| trans-butene | 5.03 | 9.00 |
| n-butylene | 15.43 | 27.55 |
| isobutylene | 20.25 | 36.16 |
| cis-butene | 4.28 | 7.64 |
| neo-pentane | 0.10 | 0.18 |
| 1,2-butadiene | 0.37 | 0.66 |
| 1,3-butadiene | 44.46 | 0.83 |

TABLE 2.2

Summary of experiments

| Example | 2 | 3 | 4 | 5 |
|---|---|---|---|---|
| DIBAH | 1.75 ml | 2.5 ml | 2.8 ml | 3.5 ml |
| EASC | 7.8 g | 7.8 g | 11.1 g | 15.6 g |
| NDV | 0.35 ml | 0.35 ml | 0.5 ml | 0.5 ml |
| Yield | 73.3 g | 76.2 g | 81.1 g | 83.6 g |
| Mooney value | 87 MU | 72 MU | 53 MU | 37 MU |
| cis-1,4 content | 98.4% | 98.2% | 98.1% | 97.5% |
| Glass transition | −109.9° C. | −112.4° C. | −110.7° C. | −413.2° C. |
| Mn | 106 kg/mol | 86 kg/mol | 52 kg/mol | 40 kg/mol |
| Mw | 580 kg/mol | 561 kg/mol | 396 kg/mol | 338 kg/mol |
| Mw/Mn | 5.49 | 0.48 | 7.55 | 8.52 |

Example 6

The procedure was as in Examples 2–5, except that the C4 cut was not diluted with hexane.
Table 3 below gives the amounts used and the results:

Table 3: Amounts used and results obtained in Example 3

| | |
|---|---|
| DIBAH | 1.75 ml |
| EASC | 7.8 g |
| NDV | 0.35 ml |
| total amount of C4 cut | 300 g |
| 1,3-butadiene content | 45.5% |
| yield | 107.6 g |
| Mooney value | n.d. |
| cis-1,4 content | 98.7% |
| glass transition | −111.5° C. |
| Mn | 312 kg/mol |
| Mw | 940 kg/mol |
| Mw/Mn | 3 |

Examples 7–10

The procedure was the same as in Examples 2–5, except that 329 g n-hexane were added as a diluent here. The C4 cut which was used contained 74.25% 1,3-butadiene and 0.848% 1,2-butadiene. Moreover, in Examples 4b–d, additional 1,2-butadiene was added to the 1,2-butadiene which was already contained in the C4 cut.

The amounts used and results obtained are given in Table 4.

TABLE 4

Amounts used and results obtained in Examples 7–10

| Example | 7 | 8 | 9 | 10 |
|---|---|---|---|---|
| DIBAH | 3.5 ml | | | |
| EASC | 15.6 g | | | |
| NDV | 0.7 ml | | | |
| amount of C4 cut | 180 g | | | |
| 1,2-butadiene added | — | 0.42 g | 0.84 g | 1.68 g |
| Yield | 71.4 g | 71.0 g | 71.5 g | 70.3 g |
| Mooney value | 28 MU | 33 MU | 23 MU | 19 MU |
| cis-1,4 content | 97.2% | 97.3% | 98.0% | 98.0% |
| Glass transition | −109.4° C. | −110.4° C. | −103.6° C. | −112.2° C. |
| Mn | 56 kg/mol | 50 kg/mol | 50 kg/mol | 44 kg/mol |
| Mw | 410 kg/mol | 364 kg/mol | 363 kg/mol | 303 kg/mol |
| Mw/Mn | 7.36 | 7.32 | 7.23 | 6.93 |

Example 11

Example 7 was repeated, except that 280 g cyclohexane were used instead of n-hexane, 4.8 g nickel octoate (10% in hexane) were used instead of NDV, 0.6 g $BF_3(Et_2O)$ were used instead of EASC, and 3.4 g triethylaluminum were used instead of DIBAH. No reaction occurred.

Examples 12–17

Preparation of Powder Medium

Vulkasil S (VS S) or Zeosil ZS 45 (ZS 45) were used as the powder medium. Vulkasil S is a precipitated hydrated silica (Degussa) with an average particle size of 18 μm, a BET specific surface of 164 m²/g and a pore volume of 1.91 ml/g. Before it was used as a powder medium, Vulkasil S was dried at 900° C. in a countercurrent flow of nitrogen and was taken off with the exclusion of air and moisture.

Thereafter, Vulkasil S was coated, analogously to Example 1c), with 250 μmol DIBAH /g. Zeosil ZS 45 was prepared analogously to Example 1c).

Preparation of Catalysts

The catalysts which were used were prepared analogously to Example 1b) and contained different amounts of neodymium versatate NDV per g catalyst and different amounts of DIBAH/NDV. (see Table 6.1).

TABLE 6.1

|  | NDV/g catalyst | DIBAH/NDV |
|---|---|---|
| catalyst system I | 94.4 | 20:1 |
| catalyst system II | 138.1 | 20:1 |
| catalyst system III | 72.6 | 20:1 |
| catalyst system IV | 72.6 | 30:1 |

Examples 12–17 below resulted in finely divided BR suspensions and thus verified the stability of the disperse BR/butadiene/butane system over a wide temperature range:

Polymerization Details

The corresponding amount of powder medium (Vulkasil S or Zeosil ZS 45) was introduced into a 3 liter steel autoclave fitted with a mechanical stirrer, torque recorder, temperature sensor, manometer, transfer lock and a heating and cooling mantle. Thereafter, the reactor was evacuated and was charged with about 500 g butane and about 200 g butadiene. The polymerization mixture was maintained at the desired polymerization temperature by means of a thermostat. After adding the catalyst, polymerization was conducted for 60 minutes. During the entire duration of the experiment, the suspension had a low viscosity and could readily be stirred. Moreover, no deposits were formed on the stirrer or on the reactor walls.

The following procedure was employed in order to assess the fine particulate nature of the products in the optimum manner: the reaction mixture was cooled to 25° C. and the reaction was stopped by adding 600 ml of a 0.5% by weight solution of Vulkanox BKE in acetone. Butane and unpolymerized butadiene were removed by evaporation. In all the examples, the polymer was obtained in the form of a finely divided suspension in acetone, and after filtration was dried at 50° C. in a vacuum drying oven. The reaction conditions and yields of the individual experiments, as well as the polymer properties of the polymers obtained, are in listed in Table 6.2

TABLE 6.2

| Example | 12 | 13 | 14 | 15 | 16 | 17 |
|---|---|---|---|---|---|---|
| Catalyst system [$10^{-4}$ mol Nd] | 2.79 (I) | 2.65 (I) | 2.86 (I) | 2.99 (I) | 3.00 (II) | 3.22 (II) |
| Powder medium [g] | 6.30(VSS) | 5.78(VSS) | 6.06(VSS) | 6.06(VSS) | 6.36(ZS45) | 6.30(ZS45) |
| Butane [g] | 504.6 | 509.4 | 506.1 | 506.5 | 502.8 | 500.9 |
| Butadiene [g] | 209.8 | 203.6 | 200.3 | 204.6 | 205.6 | 201.7 |
| Butadiene [% by weight] | 29 | 29 | 28 | 29 | 29 | 29 |
| Temperature (° C.) | 60 | 70 | 80 | 90 | 105 | 115 |
| Pressure [bar] | 6.7–5.5 | 8.1–7.0 | 10.2–9.1 | 12.5–12.0 | 22.8–17.5 | 22.6–17.0 |
| Yield [g] | 210 | 205 | 209 | 212 | 185 | 187 |
| Conversion [%] | 99.9 | 96.5 | 99.9 | 99.9 | 85.8 | 88.7 |
| Nd content in BR [ppm] | 192 | 186 | 206 | 204 | 240 | 248 |
| ML(1 + 4') 100° C. [MU] | 44.8 | 64.2 | 65.2 | 59.6 | n. d. | n. d. |

Examples 18–23

The following polymerization examples show the stability of the disperse BR/butadiene/butane system, even when mixtures with a high concentration of monomers are polymerized.

The powder medium and catalyst were added in the corresponding amounts to a 3 liter steel autoclave fitted with a mechanical stirrer, torque recorder, temperature sensor, manometer, transfer lock and a heating and cooling mantle. Thereafter, the reactor was evacuated and was charged with about 420 g butane and about 280 g butadiene. After maintaining the polymerization mixture at the desired polymerization temperature by means of a thermostat, polymerization was conducted for 60 minutes. During the entire duration of the experiment, the suspension had a low viscosity and could readily be stirred. Moreover, no deposits were formed on the stirrer or on the reactor walls. In order to assess the fine particulate nature of the suspension, the reaction mixture was cooled to 25° C. and the reaction was stopped by adding 600 ml of a 0.5% by weight solution of Vulkanox BKF in acetone. Butane and unpolymerized butadiene were removed by evaporation. In all the examples, the polymer was obtained in the form of a finely divided suspension in acetone, and was dried at 50° C. in a vacuum drying oven. The reaction conditions and yields of individual experiments are in listed in Table 7.

TABLE 7

| Example | 18 | 19 | 20 | 21 | 22 | 23 |
|---|---|---|---|---|---|---|
| Catalyst system [$10^{-4}$ mol Nd] | 2.95 (I) | 2.96 (I) | 2.99 (I) | 3.00 (II) | 3.17(III) | 3.13(IV) |
| Powder medium [g] | 6.02(VSS) | 7.90(VSS) | 7.76(VSS) | 6.13(ZS45) | 5.89 (ZS45) | 7.94(VSS) |
| Butane [g] | 444.8 | 466.5 | 441.4 | 506.6 | 513.1 | 445.5 |
| Butadiene [g] | 259.0 | 270.4 | 278.0 | 208.7 | 203.4 | 269.5 |
| Butadiene [% by weight] | 37 | 37 | 39 | 29 | 28 | 38 |
| Heat-up/polymerization time [min] | 12/60 | 30/60 | 30/60 | 8/60 | 15/60 | 26/60 |
| Temperature (° C.) | 60 | 80 | 80 | 80 | 80 | 80 |
| Pressure [bar] | 6.0–5.5 | 9.5–9.1 | 10.0–9.0 | 9.7–9.5 | 9.7–9.5 | 9.8–9.0 |
| Yield [g] | 268.2 | 274.6 | 278.5 | 210.90 | 208.65 | 281.6 |
| Conversion [%] | 99.9 | 97.5 | 99.9 | 97.0 | 97.5 | 99.9 |
| Nd content in BR [ppm] | 168 | 165 | 150 | 205 | 219 | 160 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for the suspension polymerization of conjugated dienes in hydrocarbon mixtures comprising a fraction by volume greater than 80% of $C_4$ hydrocarbons, wherein polymerization is conducted in the presence of a catalyst system comprising a rare earth compound, one or more aluminum compounds, and optionally, an additional Lewis acid.

2. A method according to claim 1, wherein an industrial $C_4$ hydrocarbon mixture is used as the hydrocarbon mixture.

3. A method according to claim 1, wherein the hydrocarbon mixture contains 1,2-butadiene.

4. A method according to claim 1, wherein said rare earth compound comprises a neodymium compound or a mixture of a neodymium compound with an additional rare earth compound.

5. A method according to claim 1, wherein the catalyst system of each component of the catalyst system are deposited on a support.

6. A method according to claim 1, wherein the polymerization is conducted in the presence of a powder medium.

7. The production of tires by the suspension polymerization of conjugated dienes in hydrocarbon mixtures comprising a fraction by volume greater than 80% of $C_4$ hydrocarbons, wherein polymerization is conducted in the presence of a catalyst system comprising a rare earth compound, one or more aluminum compounds, and optionally, an additional Lewis acid.

8. The production of industrial rubber products by the suspension polymerization of conjugated dienes in hydrocarbon mixtures comprising a fraction by volume greater than 80% of $C_4$ hydrocarbons, wherein polymerization is conducted in the presence of a catalyst system comprising a rare earth compound, one or more aluminum compounds, and optionally, an additional Lewis acid.

* * * * *